United States Patent [19]
Ostermaier et al.

[11] 3,957,689
[45] May 18, 1976

[54] PROCESS FOR PREPARING AN ATTRITION RESISTANT ZEOLITE HYDROCARBON CONVERSION CATALYST

[75] Inventors: John Joseph Ostermaier; Curtis Homer Elliott, Jr., both of Baltimore, Md.

[73] Assignee: W. R. Grace & Co., New York, N.Y.

[22] Filed: Aug. 2, 1974

[21] Appl. No.: 494,247

[52] U.S. Cl. ............................................. 252/455 Z
[51] Int. Cl.² .......................................... B01J 29/06
[58] Field of Search ................................ 252/455 Z

[56] References Cited
UNITED STATES PATENTS

| | | | |
|---|---|---|---|
| 3,414,525 | 12/1968 | Michalko | 252/455 Z |
| 3,592,778 | 7/1971 | Vesely | 252/455 Z |
| 3,867,308 | 2/1975 | Elliott, Jr. | 252/455 Z |

Primary Examiner—Carl F. Dees
Attorney, Agent, or Firm—Joseph P. Nigon

[57] ABSTRACT

A process for preparing a hydrocarbon cracking catalyst which consists of preparing a silica hydrosol, adjusting the pH of the sol and at the same time buffering the sol by adding an aluminum sulfate solution, adding clay and zeolitic components, spray drying, washing with water, rare earth exchanging if desired and recovering the product. The catalyst is characterized by excellent attrition resistance and activity.

5 Claims, No Drawings

PROCESS FOR PREPARING AN ATTRITION RESISTANT ZEOLITE HYDROCARBON CONVERSION CATALYST

BACKGROUND OF THE INVENTION

The introduction of molecular sieve-type cracking catalysts resulted in a dramatic improvement in cracking activity and selectivity of the catalyst. The sieves were found to have intrinsic activity for cracking far greater than the conventional silica-alumina cracking catalysts that were in use at the time of the introduction of the molecular sieve-type catalyst.

There are several patents describing processes for the preparation of these zeolites. U.S. Pat. No. 3,692,665, for example, covers a method for preparing a faujasite type zeolite that is stabilized by cation and thermal stabilization. The older more conventional cracking catalysts are described in patents such as U.S. Pat. No. 3,404,097 to Wilson et al. which describes a silica magnesia fluoride catalyst. U.S. Pat. No. 3,650,988 of Magee et al. covers a process for preparing a hydrocarbon cracking catalyst containing a semi-synthetic portion, i.e., clay, silica-alumina and a zeolite portion. There are several other patents describing processes for preparing molecular sieve-type catalysts. U.S. Pat. No. 3,425,956 of Baker et al. is typical of a large body of art in this area.

Copending application Ser. No. 423,637 of Elliott filed Dec. 10, 1973, now U.S. Pat. No. 3,867,308 describes a process for preparing a cracking catalyst by preparing a hydrosol by rapid addition of mineral acid to sodium silicate, adjusting the pH of the sol, adding clay and zeolitic components, spray drying, washing with water, rare earth exchanging and recovering the product. The instant case process is an improvement over this process, in that it affords much better control of the pH during the catalyst preparation and minimize problems that might arise due to gelling of the silica hydrosol in the equipment during the processing.

BRIEF DESCRIPTION OF THE INVENTION

We have found that a catalyst exhibiting excellent attrition resistance and high activity can be prepared by binding clay and faujasite with a buffered silica hydrosol. In the process of our invention problems arising from the tendency of the sol to gel due to inadvertant changes of pH during processing is minimized by buffering the sol in the desired pH range by the addition of a mixed sulfuric acid-aluminum sulfate solution. The silica hydrosol is buffered in the pH range of 2 to 3.2. The buffered silica hydrosol contains between 1 and 10% alumina by weight of the solids. The buffering of the pH of the silica hydrosol in the range of 2.0 to 3.2 allows more flexibility in the processing step.

In a typical preparation the silica hydrosol contains between 5 to 15% silica and 1 to 10% of the solids is alumina resulting from the addition of the buffering agent.

In the next step of the process clay is added to the buffered silica sol. The clay is present in an amount of about 10 to 65% by weight of the finished catalyst. Naturally occurring clay such as kaolin, halloysite and montmorilonite may be used. Commercially available clay is described as having a particle in the range of 60 to 80% less than 2 microns. Although, naturally occurring clays are used to advantage in the preparation of this catalyst, it is contemplated that heat or chemically modified clays such as metakaolin or acid treated halloysite may be used. The clay can be added to the buffered silica sol or it can be added to the silicate prior to sol formation. When the clay is added to the buffered sol it may be added at any pH in the range of 3.0 to 8.0. The clay can be added dry or as a slurry.

The zeolite is added in the next step of the process. The preferred zeolite is a widely available zeolite known as faujasite. The zeolites publicized by Linde Division of Union Carbide Corporation as type X and type Y zeolites have the faujasite structure. These zeolites normally have a silica to alumina ratio of about 2.5 to about 6.0 with those having a silica to alumina ratio of about 3.5 to 6 being the preferred faujasite. In addition to the faujasite, other widely known zeolitic materials resistant to acid conditions specific to this process can also be used. The zeolite is added in an amount equal to 5 to 60% of the final catalyst with 5 to 30% being preferred.

The improvement of the process of the instant application over the process disclosed in application Ser. No. 423,637 is most evident in this step of the process. The careful control of the pH that is required in the process described as in Ser. No. 423,637 is not as critical in the process of our invention since the tendency for the silica hydrosol to thicken and set to a solid is greatly reduced. The faujasite is added to the buffered silica hydrosol as a slurry adjusted to a pH of 3 to 5 without any danger of silica gel being precipitated at the interface of the particles of the faujasite. The pH of the faujasite slurry is adjusted by the addition of a dilute solution of a strong mineral acid. When the pH of the faujasite is adjusted to between 3 and 5 the faujasite can be easily dispersed into the buffered silica hydrosol carrier without particle encapsulation or gell lump formation.

The next step of the process is the spray drying. The buffered silica hydrosol-clay-zeolite spray drier feed slurry will have a pH of between 2.8 and 3.5. It is important that the pH be maintained within this range since destruction of the zeolite results if the pH of the sol is below 2.8 and some difficulty with thickening of the slurry might result if the pH is above 3.5.

The slurry can be spray dried without difficulty. The spray drier is normally operated at an outlet temperature of about 250° to 600°F. Operating the spray drier at the lower temperature results in the product having improved attrition resistance. The spray drier reslurry should be maintained at a pH of 4.5 to 5.0 to prevent alumina loss, by addition of a base compatible with the catalyst.

One of the important advantages of the process is found in the washing step. The spray dried catalyst can be washed with hot water. This is advantageous over the prior art methods of washing that required a wash with ammonium sulfate. In our process the sodium oxide that is not incorporated in the faujasite is in the form of sodium sulfate that is very soluble and is easily removed by a water wash.

The last step of the process is removal of a large portion of the exchangable sodium in the faujasite by exchanging with a rare earth solution. This is normally accomplished using a commercially available rare earth chloride solution. This exchange is normally carried out with a solution containing 3 to 10% rare earth ($Re_2O_3$) at a temperature of 100 to 160°F. The exchange is effected by mixing the washed, spray dried catalyst particles with the rare earth solution for a period of about 0.25 to 1 hour. The solution is separated from the catalyst particles and the particles water washed and dried.

The catalyst is preferably dried at a temperature of about 250° to 450°F. to reduce the moisture content to below about 30 weight percent. The catalyst is then ready for use in a typical fluid cracking operation. It is contemplated that the catalyst may also be prepared in the form of a bead-type catalyst which is suitable for use in a moving bed catalytic operation.

The catalyst typically prepared according to the process of this invention had an alumina content of about 25 to 35%, a silica content of about 64 to 75%, a rare earth content of about 2.5 to 5.0%, the $Na_2O$ was less than 1% and the sulfate content less than 0.5%. The product had a water pore volume of 0.18 to 0.30, and a nitrogen pore volume of 0.10 to 0.20. The catalysts prepared by our process have an exceptionally high degree of attrition resistance. Typically, these catalysts when subjected to a standard attrition test will be found to have attrition indices of 3 to 20. The Davison Attrition Index (DI) as referred to in the following examples is determined as follows:

A 7 g. sample is screened to remove particles in the 0 to 20 micron size range. The particles above 20 microns are then subjected to a 5 hour test in the standard Roller Particle Size Analyzer using a 0.07 inch jet and 1 inch I.D. U-Tube as supplied by American Instrument Company, Silver Spring, Md. An air flow of 21 liters per minute is used. The Davison Index is calculated as follows:

$$\text{Davison Index} = \frac{\text{0-20 micron material formed during test}}{\text{Original 20 + micron fraction}} \times 100$$

Our novel catalyst was evaluated by comparing the activity of these catalysts with the activity of a standard catalyst containing rare earth faujasite. In this comparison both catalysts are subjected to the standard activity test described by Ciapetta and Henderson in the Oil and Gas Journal of Oct. 16, 1967 at pages 88 to 93. This procedure for comparing the activity of our catalyst with the standard catalyst is used to obtain the data set forth in the following examples.

Our invention is illustrated by the following specific but non-limiting examples.

EXAMPLE 1

An acid alum solution was prepared by mixing 10 l. of 18° Be sulfuric acid and 3420 ml. of the solution of aluminum sulfate containing 77.2 g. of alumina. In this solution 25% of the hydrogen ion equivalents are present as aluminum $Al^{+++}$ The acid alum solution was pumped to a high speed mixer at a rate of 740 cc per minute where it was mixed with an 18° Be sodium silicate solution having an $SiO_2$/$Na_2O$ ratio of 3.36. The silicate solution had been fed to the mixer at the rate of 2 gal./min. The resulting hydrosol had a pH of between 2.5 and 3.0 and had an excess of 20% of the acid-aluminum sulfate necessary to neutralize the $Na_2O$ present in the silicate.

The catalyst slurry was prepared by mixing 48.5 pounds of the above alumina stabilized silica sol with 7325 g. of calcined kaolin clay and a slurry of a synthetic faujasite in the sodium form which contained 1950 g. of faujasite on a dry weight basis and had been adjusted to a pH of about 4.0. This corresponds to a composition of 63% kaolin clay, 20% binder and 17% zeolite.

The catalyst slurry was then spray dried in a commercial drier operated at a gas inlet temperature of 700°F and a gas outlet of 300°F. The spray dried material was washed with hot water to remove the $Na_2O$ and sulfate, exchanged with rare earth chloride solution and dried. The resulting catalyst had a bulk density of 0.84 g/cc, a compacted density of 0.96 g/cc. and a Davison Attrition Index of 3.

The activity of the catalyst was compared to the activity of a standard zeolite containing catalysts in a hydrogen form using the microactivity test discussed previously. The test was carried out at a temperature of 900°F. at a weight hourly space velocity of 16. The catalyst was subjected to a steam temperature of 1050°F. and a pressure of 60 psig for 24 hours prior to the test. The gas oil conversion was 76% for the catalyst of this invention as compared to 77% conversion for the standard catalyst.

EXAMPLE 2

An acid-aluminum sulfate solution was prepared by mixing 10.1 of 18° Be sulfuric acid 3420 ml. of an aluminum sulfate solution prepared to contain 77.2 g. per liter of alumina. The acid-aluminum sulfate solution was pumped through a high shear mixer at a rate of 680 cc/min. that was mixed with an 18° Be sodium silicate solution having a $SiO_2$ to $Na_2O$ ratio of 3.36. The silica had been fed to the mixer at a rate of 2 gals./per minute. The silica alumina hydrosol had a pH of between 2.5 to 3 and corresponded to an excess of 10% of the acid required to neutralize the $Na_2O$ in the silicate by the acid-aluminum sulfate solution. The catalyst slurry was prepared by mixing 48.5 lbs. of the above hydrosol with 7325 g. of kaolin clay and a slurry of a synthetic faujasite at a pH of about 4.0 which contained 1950 g. of the faujasite in the sodium form on a dry weight basis. This corresponds to a composition of 63% kaolin clay, 20% hydrosol binder and 17% of the sodium faujasite.

The catalyst slurry was then spray dried using a commercial spray drier operated at an inlet temperature of 700°F. and an outlet temperature of 300°F. The spray dried material was then washed with hot water to remove $Na_2O$ and sulfate ions and exchanged with the rare earth chloride solution and dried. The resulting catalyst had a bulk density of 0.76 g/cc. and a compact density of 0.93 g/cc. The Davison Attrition Index was 4. The catalyst was subjected to steam at a temperature of 900°F and a pressure of 60 psig for 24 hours and then evaluated using the microactivity test discussed previously. The microactivity test was carried out at a temperature of 1070°F. and a weight hourly space velocity of 16. The catalyst had a conversion of 75% as compared to a conversion of 77% for the standard catalyst.

EXAMPLE 3

A series of runs were completed in which the catalyst was prepared using the process described in Example 1 and a reaction slurry in which 40% of the hydrogen ions equivalents were replaced by aluminum ions. The catalysts were prepared to contain 20% silica, 63% kaolin and 17% synthetic faujasite. The hydrosol was prepared at a temperature of 80°F. The mixture of sulfuric acid and aluminum sulfate was added in concentrations such that there was a 10 to 30% excess of the amount of acid-aluminum sulfate that is required to neutralize the $Na_2O$ present in the silicate.

The data collected is shown in Table I. The percent of acid-aluminum sulfate added in excess is expressed as percent neutralization, i.e., 110% for 10% excess, etc.

TABLE I

| Run No. | 1 | 2 | 3 | 4 |
|---|---|---|---|---|
| % Binder | 20 | 20 | 20 | 20 |
| % Clay | 63 | 63 | 63 | 63 |
| % Synthetic faujasite | 17 | 17 | 17 | 17 |
| % Neutralization | 100 | 115 | 120 | 130 |
| Sol pH | 3.15 | 3.10 | 3.05 | 2.90 |
| Feed pH | 3.25 | 3.25 | 3.20 | 3.10 |
| Set time of sol: Hrs. | 2.5 | 3.0 | 4.0 | 5.0 |
| Chemical analysis | | | | |
| T.V.       wt.% | 11 | 11 | 11 | 11 |
| Analysis | | | | |
| $Al_2O_3$ : " | 30 | 30 | 30 | 30 |
| $Re_2O_3$ : " | 5.6 | 5.0 | 5.1 | 5.1 |
| $Na_2O$ : " | 0.74 | 0.65 | 0.73 | 0.55 |
| $SO_4$ : " | 0.09 | 0.09 | 0.08 | 0.09 |
| Physical Analysis | | | | |
| SA : $m^2/g$ | 180 | 149 | 178 | 141 |
| $N_2$ pore vol. : cc/g | 0.15 | 0.11 | 0.15 | 0.24 |
| $H_2O$ pore vol. : cc/g | 0.25 | 0.22 | 0.24 | 0.26 |
| Density in g/cc | 0.76 | 0.76 | 0.73 | 0.76 |
| Average bulk compacted | 0.94 | 0.95 | 0.82 | 0.95 |
| Davison Index | 4 | 6 | 8 | 6 |
| Pk. Hgt. at 1000°F: mm | 62 | 66 | 64 | 41 |
| Activity Data | | | | |
| % Conv./Standard Conversion Catalyst (S1050, 16WHSV) | 77/76 | 78/76 | 75/76 | 77/76 |

The catalysts prepared were excellent in all respects except that there was a significant loss of zeolite at the 130% neutralization evidenced by the peak height loss after calcination at 1000°F in Run 4.

EXAMPLE 4

In this example the effect of preparing the catalyst with the buffered silica hydrosol, and using mother liquor to supply 17.5% of the silica in the hydrosol was studied. The formulation was modified to contain 23% silica, 60% calcined clay and 17% synthetic faujasite which was subsequently converted to the rare earth form. The hydrosol was prepared out at a temperature of 80°F. The data collected in this series of runs, where the amount of sulfuric acid-aluminum sulfate mix was added in a concentration sufficient to provide 10, 15 and 20% excess of the amount required for neutralization of the $Na_2O$ present in the sodium silicate is set out in Table II.

TABLE II

| Run No. | 1 | 2 | 3 |
|---|---|---|---|
| % Binder | 23 | 23 | 23 |
| % Kaolin Clay | 60 | 60 | 60 |
| % Synthetic faujasite | 17 | 17 | 17 |
| % of $SiO_2$ as Mother Liquor | 17.5 | 17.5 | 17.5 |
| % Neutralization | 110 | 115 | 120 |
| Sol pH | 3.15 | 3.05 | 3.00 |
| Sol Temp. | 80°F. | 80°F. | 80°F. |
| Feed pH | 3.30 | 3.25 | 3.20 |
| Feed Temp. | 80°F. | 80°F. | 80°F. |
| Set Time of Feed at 80°F. | 5 hrs. | 6 hrs. | 6 hrs. |
| Chemical Analysis | | | |
| T.V. :    wt.% | 10.6 | 10.6 | 10.6 |
| $Al_2O_3$ :    Wt. % | 30.7 | 28.4 | 27.7 |
| $Re_2O_3$ :    wt. % | 4.2 | 3.9 | 4.3 |
| $Na_2O$ :    wt. % | 0.72 | 0.72 | 0.64 |
| $SO_4$ :    wt. % | 0.02 | 0.05 | 0.06 |
| Physical Analysis | | | |

TABLE II-continued

| Run No. | 1 | 2 | 3 |
|---|---|---|---|
| S.A. : $m^2/gm$ | 172 | 171 | 173 |
| $N_2$PV : cc/gm | .13 | .13 | .14 |
| H O PV: cc/gm | .23 | .21 | .23 |
| Density in g/cc. | .78 | .78 | .77 |
| Average bulk compacted | .81 | .82 | .79 |
| DI | 8 | 7 | 8 |
| Pk. Ht. at 1000°F: mm | 58 | 59 | 58 |
| Activity Data | | | |
| % Conv./Standard Catalyst (S1050, 16 WHSV) | 77/76 | 78/76 | 75/76 |

The data shown in Table II indicate excellent catalyst quality at neutralization levels between 10 and 20% excess and sol temperatures of 80°F.

EXAMPLE 5

Since operating at a sol temperatures of 80°F. places an extra burden on the plant operation, the effect of sol temperature on catalyst properties was investigated where the sol was prepared at temperatures of 115° to 120°F.

The process used was essentially the same as described in Example 1. The catalysts are made using the same ratios of reactants and the same formulation as described in Example 4 above. The data collected in this series of runs is set out in Tables III and IV.

TABLE III

| Run No. | 1 | 2 | 3 |
|---|---|---|---|
| %$SiO_2/Al_2O_3$ binder | 23 | 23 | 23 |
| % KCS Kaolin Clay | 60 | 60 | 60 |
| % Synthetic faujasite | 17 | 17 | 17 |
| % of $SiO_2$ as Mother Liquor | 17.5 | 17.5 | 17.5 |
| % Neutralization | 110 | 115 | 120 |
| Sol pH | 2.9 | 2.95 | — |
| Sol Temp. | 120°F. | 120°F. | 115°F. |
| Feed pH | 3.15 | 3.15 | 3.10 |
| Feed Time | 100°F. | 100°F. | 100°F. |
| Set Time of Feed at 100°F. | 50 min. | 1 hr. & 20 min. | 2 hrs. |
| Chemical Analysis | | | |
| T.V.:    wt.% | 10.9 | 10.7 | 10.7 |
| $Al_2O_3$ :    wt. % | 29.4 | 30.4 | 30.2 |

TABLE III-continued

| Run No. | | 1 | 2 | 3 |
|---|---|---|---|---|
| $Re_2O_3$ : | wt. % | 4.6 | 4.7 | 4.5 |
| $Na_2O_3$ : | wt. % | 0.61 | 0.64 | 0.60 |
| $SO_4$ : | wt. % | 0.05 | 0.05 | 0.05 |
| Physical Analysis | | | | |
| S.A. : $m^2$/gm | | 218 | 217 | 203 |
| $N_2$PV : cc/gm | | .16 | .16 | .14 |
| $H_2O$ PV : cc/gm | | .24 | .26 | .25 |
| Density g/cc | | .67 | .72 | .76 |
| Average bulk compacted | | .73 | .79 | .79 |
| Davison Index | | 5 | 6 | 6 |
| Pk. Ht. at 1000°F.:mmm | | 68 | 61 | 63 |
| Activity data: | | | | |
| %Conv./ Standard Catalyst (S1050, 16WHSV) | | 76/77 | 76/77 | 75/77 |

In Table III the sol temperature was 120°F. and in the data presented in Table IV the sol temperature was 112° to 114°F.

A review of the data presented in Table III would indicate that there is a decrease in density when the catalyst is prepared using a sol temperature of 120°F. and using a 10% excess of the amount of acid required for neutralization. There is no apparent effect on the attrition resistance when the sol temperature is 115° to 120°F.

Comparison of the data presented in Tables II, III, and IV indicate that pH decreases with increased temperature at a fixed neutralization level. There also appears to be a loss of peak height when the pH of the sol falls below about 2.9. The data indicate that a desirable sol pH range is 2.95 to 3.2 since this range yields good peak height retention and the sol set time is reasonable.

EXAMPLE 6

In the runs described in the previous examples the spray dried catalyst was reslurried in hot water with no pH control. This was found to give pH values in the reslurry tanks of about 3 which is accompanied by some loss of alumina from the spray dried binder. A series of runs were completed in which the catalyst was washed in a pH of 3, 3.5 and 6.5. The data collected in this series of runs is set out in Table V.

TABLE IV

| Run No. | 1 | 2 | 3 | 4 |
|---|---|---|---|---|
| % Binder | 23 | 23 | 23 | 23 |
| % KCS Kaolin Clay | 60 | 60 | 60 | 60 |
| % Synthetic faujasite | 17 | 17 | 17 | |
| % of $SiO_2$ as Mother Liquor | 17.5 | 17.5 | 17.5 | 17.5 |
| % Neutralization | 105 | 110 | 115 | 120 |
| Sol pH | 3.00 | 2.95 | — | 2.85 |
| Sol Temp. | 112°F. | 112°F. | 114°F. | 114°F. |
| Feed pH | 3.20 | 3.10 | 3.10 | 3.05 |
| Feed Temp. | 98°F. | 98°F. | 98°F. | 98°F. |
| Set Time of Feed at 100°F. | 1.25 hr. | 1.5 hr. | 2.0 hr. | 2.5 hr. |
| Chemical Analysis | | | | |
| T.V. : wt.% | 11.1 | 10.9 | 11.2 | 11.3 |
| $Al_2O_3$ : wt.% | 30.1 | 29.3 | 30.3 | 29.7 |
| $Re_2O_3$ : wt.% | 4.6 | 4.4 | 4.4 | 4.5 |
| $Na_2O$ : wt.% | 0.68 | 0.65 | 0.57 | 0.58 |
| $SO_4$ : wt.% | 0.04 | 0.05 | 0.02 | 0.06 |
| Physical Analysis | | | | |
| S.A. | 191 | 198 | 190 | 179 |
| $N_2$PV | 0.16 | 0.23 | 0.15 | 0.17 |
| $H_2O$ PV | 0.24 | 0.26 | 0.26 | 0.25 |
| Density g/cc | 0.78 | 0.75 | 0.78 | 0.75 |
| Average bulk compacted | 0.81 | 0.78 | 0.81 | 0.78 |
| Davison Index | 5 | 7 | 3 | 7 |
| Pk. Ht. at 1000°F: mm | 64 | 63 | 55 | 51 |
| Activity Data: | | | | |
| % Conv./Standard Catalyst (S1050, 16 WHSV) | 77/74 | 76/74 | 73/74 | 76/74 |

TABLE V

| Run No. | 1 | 2 | 3 | 4 |
|---|---|---|---|---|
| % Binder | 20 | 20 | 23 | 23 |
| % $H^+$ as $Al^{+++}$ | 25 | 25 | 40 | 40 |
| % Clay | 63 | 63 | 60 | 60 |
| % Synthetic faujausite | 17 | 17 | 17 | 17 |
| % of $SiO_2$ as Mother Liquor | 0 | 0 | 17.5 | 17.5 |
| Sol Temp. | 80°F. | 80°F. | 113°F. | 113°F. |
| % Neutralization | 105% | 105% | 110% | 110% |
| Reslurry pH | 3.5 | 6.5 | 3.0 | 6.5 |
| Chemical Analysis | | | | |
| T.V. : Wt.% | 10 | 10 | 11 | 11.4 |
| $Al_2O_3$ : Wt.% | 32 | 31 | 29.3 | 29.7 |
| $Re_2O_3$ : Wt.% | 3.6 | 4.1 | 4.4 | 4.4 |
| $Na_2O$ : Wt.% | 0.84 | 0.65 | 0.65 | 0.61 |
| $SO_4$ : Wt.% | 0.06 | 0.09 | 0.05 | 0.04 |
| Physical Analysis | | | | |
| S.A. | 160 | 171 | 198 | 200 |
| $N_2$PV | .12 | .12 | .13 | .17 |
| $H_2O$PV | .21 | .22 | .26 | .24 |

TABLE V-continued

| Run No. | 1 | 2 | 3 | 4 |
|---|---|---|---|---|
| Density g/cc | .72 | .78 | .75 | .76 |
| Average bulk compacted | .93 | .93 | .78 | .78 |
| Davison Index | 10 | 10 | 7 | 4 |
| Pk. Ht. at 1000°F:mm | 66 | 66 | 63 | 60 |
| Activity Data: | | | | |
| % Conv./Standard Catalyst (S1050, 16 WHSV) | 76/76 | 75/75 | 76/74 | 76/73 |

The data collected in this series of runs indicates that there is an improvement in attrition, as evidenced by the Davison Index, when the pH is increased to 6.5 and the sol temperature is maintained at 113°F.

What is claimed is:

1. A process for preparing a hydrocarbon conversion catalyst having high activity and high density which comprises:
   a. preparing a buffered silica sol by decreasing the pH of a sodium silicate solution to pH 2.0 to 3.2 by adding a mixed sulfuric acid-aluminum sulfate solution,
   b. adding clay before, during or after sol formation,
   c. preparing a water slurry of a crystalline zeolitic aluminosilicate and adjusting the pH to about 3 to 5,
   d. mixing said slurry with the buffered silica sol-clay slurry prepared in step (b), to prepare a spray drier feed slurry having a pH of 2.5 to 3.5
   e. spray drying,
   f. washing with water, drying and recovering the product.

2. The process according to claim 1 wherein the clay is added in an amount equal to about 10-65 percent of the finished catalyst.

3. The process according to claim 1 wherein the zeolitic aluminosilicate is added in an amount equal to about 5-60 percent of final catalyst.

4. The process according to claim 1 wherein the zeolitic aluminosilicate has a silica to alumina ratio of about 3.5 to 6.0.

5. A process for preparing a petroleum cracking catalyst which comprises:
   a. preparing a buffered silica sol by rapidly adjusting the pH of a sodium silicate solution to a pH of 2.0 to 3.2 with mixed sulfuric acid-aluminum sulfate solution wherein said sol contains 5 to 10% silica and 1 to 10% of the solids is alumina,
   b. adding a quantity of a kaolin clay in an amount sufficient to provide about 50-65 weight percent of the final catalyst to said silica sol,
   c. preparing an aqueous slurry of a faujasite having a silica to alumina ratio of about 4.5-5.2 and adjusting the pH of said slurry to about 3.5 to 4.5 by adding a mineral acid,
   d. adding said slurry to the silica sol-clay slurry prepared in step (b), in an amount sufficient to provide about 15 to 25 percent of the final catalyst,
   e. adjusting the resultant slurry to a pH of 2.9 to 3.3 spray drying and washing with water to decrease the $SO_4$ content to less than 1 percent,
   f. exchanging the dryer product with a rare earth solution to provide a rare earth content of about 2.5 to 5 weight percent in the final product,
   g. washing, drying and recovering the catalyst.

* * * * *